United States Patent [19]

Peerman et al.

[11] Patent Number: 4,525,890
[45] Date of Patent: Jul. 2, 1985

[54] PAINTBRUSH EMBEDMENT COMPOUND AND PAINTBRUSH CONSTRUCTION AND METHOD EMBODYING SAME

[75] Inventors: Dwight E. Peerman, Minnetonka; H. Gorden Kanten, Minneapolis; Kelvin K. Bonnema, Moundsview, all of Minn.

[73] Assignee: Henkel Corporation, Minneapolis, Minn.

[21] Appl. No.: 472,179

[22] Filed: Mar. 4, 1983

[51] Int. Cl.³ .................. C08G 18/48; C08G 18/42; A46B 1/00; A46D 1/00
[52] U.S. Cl. ......................... 15/193; 156/72; 156/293; 156/305; 300/21; 528/65; 528/67
[58] Field of Search ............ 15/193; 300/21; 528/65, 528/67

[56] References Cited

U.S. PATENT DOCUMENTS

| 2,274,002 | 2/1942 | Saltzman | 15/193 |
| 2,648,861 | 8/1953 | Hardman et al. | 15/192 |
| 2,664,582 | 1/1954 | Kammann | 15/143 |
| 2,880,192 | 3/1959 | Coffey et al. | 525/440 |
| 3,142,081 | 7/1964 | Hartz et al. | 15/193 |
| 3,248,373 | 4/1966 | Barringer | 528/65 |
| 3,386,119 | 6/1968 | Shulman | 15/193 |
| 3,701,374 | 10/1972 | McGillvary | 152/330 |
| 3,819,779 | 6/1974 | Pharris et al. | 15/193 |
| 4,125,545 | 11/1978 | Kroplinski | 260/404.5 |
| 4,194,940 | 3/1980 | Damicor et al. | 156/331 |

OTHER PUBLICATIONS

Moore–Physical Chemistry, 4th Ed., Longmans Green (London) 1963, pp. 228–230.
Cluff et al., vol. XLV, Issue 146, Aug. 1960, pp. 341–345.
Hepburn–Polyurethane Elastomers, Applied Science Publ. (London) 1982, pp. 27, 28, 34–46, 48, 76–80.
Saunders et al., Polyurethanes Part II, Interscience (N.Y.) 1964, pp. 299–304, 307–308, 333, 335–338, 341, 344–347, p. 653.
Wright et al., Solid Polyurethane Elastomers, Maclaren & Sons, (London), pp. 61, 247–248, 250–251.

Primary Examiner—Herbert S. Cockeram
Attorney, Agent, or Firm—Ernest G. Szoke; John Daniel Wood

[57] ABSTRACT

An embedment compound for a paintbrush or the like, together with a paintbrush construction and method of manufacture embodying the improved embedment compound. The embedment compound is a polyurethane composition having a crosslink density sufficient to render such compound acceptably resistant to all paint solvents.

22 Claims, 5 Drawing Figures

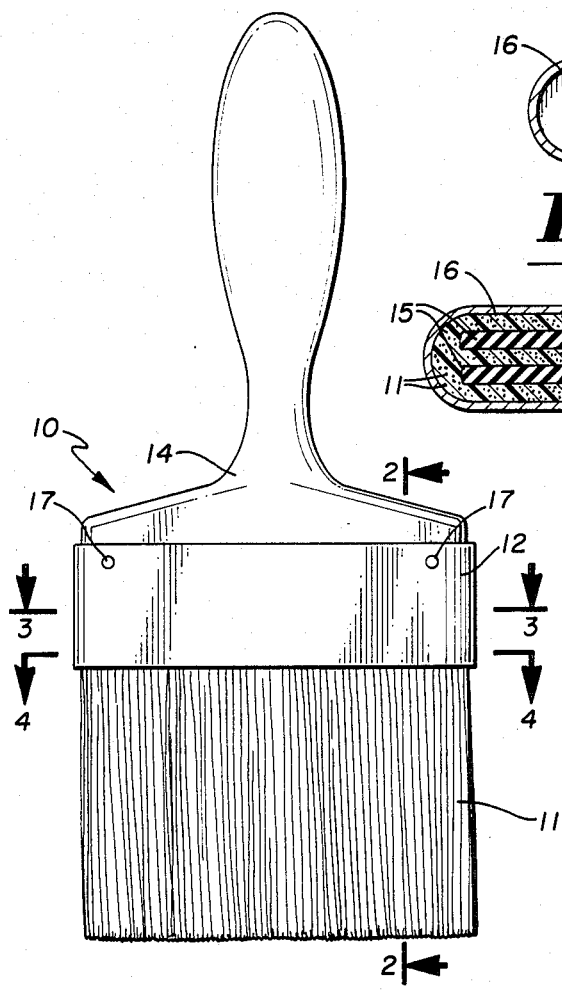
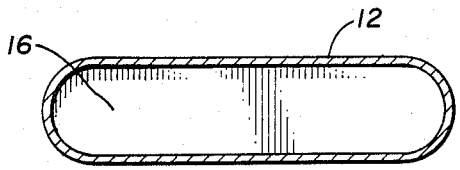
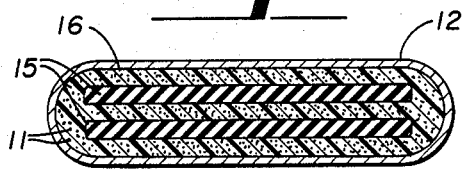
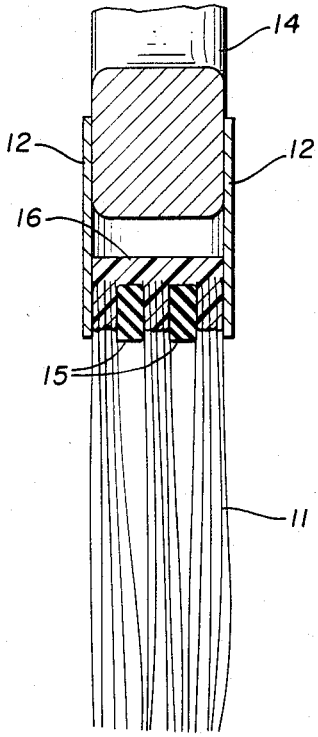
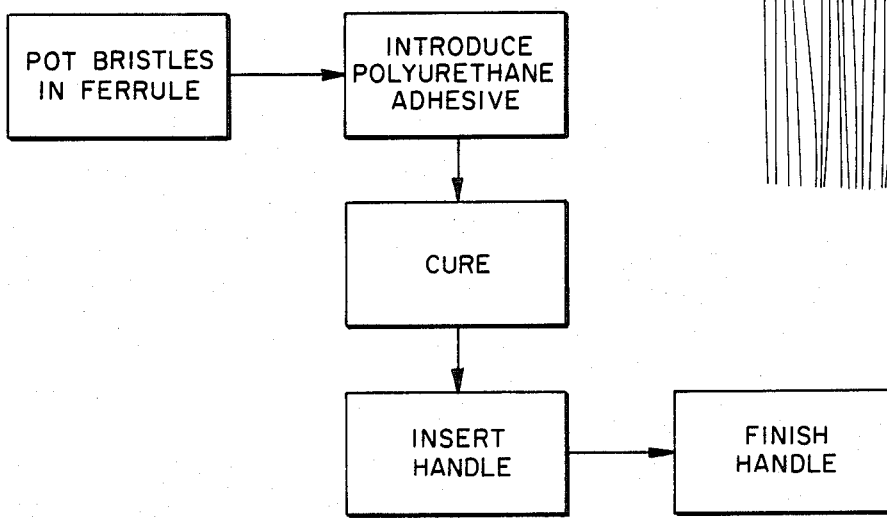

PAINTBRUSH EMBEDMENT COMPOUND AND PAINTBRUSH CONSTRUCTION AND METHOD EMBODYING SAME

BACKGROUND OF THE INVENTION

The present invention relates generally to a paintbrush embedment compound and also to a paintbrush construction and method of manufacture utilizing such embedment compound. More particularly, the present invention relates to a paintbrush construction of the type which preferably includes a ferrule, a plurality of bristles and a handle and a method of manufacturing the same utilizing an improved embedment compound comprising a highly crosslinked polyurethane composition for bonding the plurality of bristles to one another.

The method of manufacturing brushes such as paintbrushes and the like has remained relatively unchanged for a number of years. A conventional paintbrush consists of three basic elements: the bristles, which may be either natural or synthetic, the ferrule which is commonly a lightweight metal functioning to hold the potted or bundled bristles, and a handle secured to the upper portion of the ferrule. During a conventional brush manufacturing procedure, the bristles are bundled and then potted or inserted into the ferrule. Following this potting step, a bristle adhesive or embedment compound is introduced into the ferrule portion and allowed to flow downwardly into the bristles and at the same time cure and harden so as to bond the bristles to one another. The adhesives initially used for this purpose were rubber based adhesives. Sometime after World War II there was a revolution in which the previously used rubber based adhesives were replaced with epoxy adhesives. The use of epoxy adhesives for bonding the bristles together continues to be used today, almost without exception.

While epoxy adhesives and resins have been satisfactory in many applications, they also have some recognized deficiencies. For example, the ability of epoxy adhesives to bond the bristles together and to bond the bristles to the inside surface of the ferrule is limited. Further, epoxy adhesives function differently depending upon the particular material from which the bristles are constructed. Some epoxy adhesives work well with natural bristles, but not with synthetic bristles; whereas, others work well with some synthetic bristles, but not others. Thus, it is necessary and customary for brush manufacturers to maintain inventories of several different epoxy adhesives to accommodate the various bristle materials. Even when the proper epoxy adhesive is selected from the bristle material, it is generally recognized that there is very little bonding between the bristles and the inside surface of the ferrule. Because of this, there is an increased number of bristles pulled out and lost during the painting process and in some cases the entire bristle bundle can be pulled from the ferrule. The primary limitation, however, of epoxy adhesives is the amount of time normally required for curing. The normal cure time for commonly used epoxy adhesives ranges from four to twenty-four hours. Accordingly brushes constructed utilizing an epoxy adhesive do not readily facilitate a continuous manufacturing process. Although the cure time for the epoxy adhesives can be speeded up through the use of heat or accelerators, the viscosity is usually adversely affected and the fast setting epoxies are very exothermic. This causes shrinking of the cured adhesive as it cools. A further disadvantage of the relatively slow curing epoxy adhesives is that it significantly slows down the quality control evaluation. Thus, if the formulation is not correct or the penetration is unsatisfactory, a large quantity of brushes (usually several hundreds or thousands) will have been made before the error is discovered.

Accordingly, although the use of epoxy adhesives and resins in the manufacture of brushes such as paintbrushes and the like are acceptable in some applications, there are several limitations and disadvantages which exist because of the use of these adhesives.

SUMMARY OF THE INVENTION

The present invention relates to an improved paintbrush embedment compound and a paintbrush construction and method of manufacture utilizing such compound which overcomes many of the deficiencies in the prior art. More specifically, the present invention contemplates the use of a polyurethane embedment compound to replace the conventionally used epoxy system. It has been found that the use of such a polyurethane compound results in a dramatically and unanticipated superior brush. First, it was found that the bonding between the bristles and between the bristles and the inside surface of the ferrule is superior to the conventional epoxy resins. Second, the polyurethane compound contemplated by the present invention is extremely fast setting, on the order of three to twelve minutes, as compared with the four to twenty-four hours for an epoxy adhesive. This shortening of the cure time facilitates the conversion of a conventional batch method of brush manufacture to a semi-automated straight line manufacturing system. The shortened cure time also facilitates faster quality control. Because there are many variations of bristle construction and many mixtures of different kinds of bristles, the manufacturer is often unsure whether he has selected the right adhesive or embedment compound or the right consistency of the same until he has completed the manufacture of the first run of bristles. Using the polyurethane compound contemplated by the present invention, this information can be obtained within a matter of minutes, whereas an epoxy adhesive system requires a minimum of four hours and as long as a day, depending upon the particular adhesive used. Thirdly, the embedment compound of the present invention is less sensitive to changes in brush size and types of bristles.

Further, tests have shown that one formulation of the polyurethane embedment compound of the present invention will function satisfactorily for all types of bristles, both natural and synthetic. Also the viscosity and rate of cure, and thus penetration of the polyurethane adhesive into the potted bristles, can be controlled much more easily with the embedment compound of the present invention than with epoxy adhesives. Still further, although polyurethane adhesives generally exhibit limited resistance to strong solvents such as lacquer thinners, it has been found that improved solvent resistancy can be achieved with respect to all paint solvents including turpentine, mineral spirits, kerosene, gasoline, water, alcohols and particularly strong solvents such as laquer thinner by increasing the crosslink density of the polyurethane embedment compound.

Although polyurethanes have been around for 30 to 40 years, their use has been primarily in connection with foams and coatings and relatively large industrial structural applications. Polyurethane adhesives are also known in the art; however, they have been conventionally used to adhere composite panels to one another and various other applications outside of the field of paintbrushes and the like. In U.S. Pat. No. 3,819,779 issued to Pharris et al., foamed polyurethane is suggested as a compound for making the handles of a paintbrush. There is no suggestion, however, of its use as a bristle adhesive. In U.S. Pat. No. 3,142,081 to Hartz et al., the use of a polyurethane composition is suggested as a bristle reinforcement; however, again, this is not a use as a bristle adhesive for bonding the bristles to one another and to the ferrule as contemplated by the present invention. Further, there is no suggestion in the prior art of increasing the crosslink density of a polyurethane embedment compound to improve the solvent resistance characteristics.

Accordingly, an object of the present invention is to provide an improved embedment compound for a paintbrush or the like.

A further object of the present invention is to provide an improved embedment compound for a paintbrush or the like in which the cure time for the bristle bonding can be substantially reduced to facilitate a semi-automated, continuous, straight line system.

A still further object of the present invention is to provide an improved embedment compound for a paintbrush or the like in which a single adhesive formulation can be utilized for all types and mixtures of bristles and sizes of brushes.

Another object of the present invention is to provide an improved embedment compound for a paintbrush or the like which comprises a highly crosslinked polyurethane.

Another object of the present invention is to provide an improved paintbrush or the like and a method for making the same which uses the improved embedment compound described above.

These and other objects of the present invention will become apparent with reference to the drawings, the description of the preferred embodiment and the appended claims.

DESCRIPTION OF THE DRAWINGS

FIG. 1 is a front, elevational view of a paintbrush embodying the embedment compound of the present invention.

FIG. 2 is a view, partially in section, as viewed along the section line 2—2 of FIG. 1.

FIG. 3 is a view, partially in section, as viewed along the section line 3—3 of FIG. 1.

FIG. 4 is a view, partially in section, as viewed along the section line 4—4 of FIG. 1.

FIG. 5 is a flow diagram illustrating the present method of manufacturing a paintbrush or the like utilizing the embedment compound of the present invention.

DESCRIPTION OF THE PREFERRED EMBODIMENT AND METHOD

A paintbrush constructed in accordance with the present invention is illustrated in FIGS. 1, 2, 3 and 4. The general flow diagram of the method of manufacturing the brush of the present invention is illustrated in FIG. 5.

With reference first to FIGS. 1-4, the paintbrush of the present invention includes a bristle portion 11 comprising a plurality of bristles, a tubular ferrule 12 and a handle portion 14. There are a variety of types and mixtures of bristles that may be utilized. Some brushes embody natural pig bristles while others embody synthetic bristles constructed from materials such as nylon, acrylics, polyesters and polyolefins. During the process of assembling the bristles, bundles of bristles are gathered together and, in some cases, distributed around one or more separators or dividers 15, 15. The bristles 11 are then retained in that position by inserting them into the ferrule 12 in a conventional manner. In this position, a portion of the bristles 11 are tightly packed in the bottom portion of the ferrule 12 to a depth of about 3/16 to ⅜ to an inch with the remainder of the bristles 11 extending below the ferrule 12 as illustrated in FIGS. 1 and 2. As will be described in greater detail below, the bristles 11 are packed tightly enough to provide a certain resistance to the flow of an adhesive or embedment compound which is supplied into the open end of the ferrule 12. In the preferred embodiment, the dividers or separators 15, 15 can be constructed of wood or cardboard or any other material which has reasonable structural rigidity.

The tubular ferrule 12 is a generally elongated structure having an opening extending longitudinally through the structure. During the manufacture of a paintbrush or the like, the bristles which are bunched together and wrapped around the dividers 15, 15 are then held together in a tight configuration by the metal ferrule. In the preferred embodiment, the ferrule 12 is constructed of a lightweight metal which may be nickel or copper plated, although it is contemplated that other metals and materials can also be used. The principal purpose of the ferrule 12 is to hold the bristles 11 during the process of bonding the bristles to one another and to structurally connect the bristles with the handle 14. At the conclusion of this step, the bristles 11 and the dividers 15, 15 are retained within the ferrule solely by the compressive forces of the ferrule on the bristles 11.

At this stage, the preferred embodiment contemplates the introduction of a polyurethane embedment compound 16 (FIG. 2) into the open end of the ferrule so as to contact the top ends of the bristles 11 and to slowly penetrate into the bristles during the time in which the polyurethane adhesive cures. In the paintbrush industry, penetration of the embedment compound into the bristle fibers for about 3/16 to ⅜ of an inch is desired. This distance may vary depending upon the use for which the brush is intended, the type of bristles being used, or the degree to which the bristles extend into the ferrule. For instance, brushes targeted for the professional painter will be provided with greater penetration, and thus greater bonding, than cheap throw-aways. Also, bristles made from olefin materials are also provided with greater penetration because of the particular difficulty experienced in forming a bond with the bristles.

The present invention contemplates the use of a polyurethane material as the embedment compound and more specifically, a polurethane material with increased crosslinking so as to improve the solvent resistancy of the compound. Paintbrushes constructed utilizing a polyurethane embedment compound have shown remarkable and unanticipated advantages over paintbrushes constructed with conventional epoxy systems. Test procedures conducted on test brushes embodying the polyurethane embedment compound of the present invention indicated that adhesion of the embedment compound to the bristles was better than with epoxies.

Adhesion of the polyurethane embedment compound to the ferrule was also shown to be significantly superior to the epoxy adhesive systems.

In addition to the above characteristics, the polyurethane embedment compound should also preferably have characteristics which permit the desired amount of penetration into the bristles and provide acceptable resistance to the paint solvents with which the brush is intended to be used or cleaned. In general, there are two factors which have a major effect on the degree of penetration. One is the viscosity of polyurethane composition after the components have been blended and prior to curing while the other is in the gel time or the speed with which the composition cures. By increasing the viscosity and/or shortening the gel time, the penetration is decreased; conversely, decreasing the viscosity and/or lengthening the gel time results in increased penetration. Preferably, the viscosity of the embedment compound when introduced into the bristle bundle should be between about 2000 cps and 5000 cps and the gel time should be between about three minutes and twelve minutes. The above preferred values can of course vary; however, together they control the degree to which the embedment compound is permitted to penetrate into the bristles during brush construction. It is contemplated that the components of the polyurethane embedment compound would be mechanically mixed and then immediately introduced into the ferrule to pot the bristles.

Most commercially available polyols are too low in viscosity for use as an embedment compound without modifying in some way to increase viscosity. Thus, if one of these low viscosity polyols is blended with the isocyanate component, the resulting composition would flow through and penetrate the bristle bundle excessively and when cured, stiffen the brustles to the point where the brush is useless. One way of overcoming this excessive penetration is to increase the viscosity of a component of the polyurethane system by preparing a quasi prepolymer. This can be done by blending a low viscosity polyol with a less than stoichiometric amount of di- or polyisocyanate to bring the viscosity to the desired level and preferably within the range of 2500 cps and 10,000 cps. Viscosity can also be controlled to the desired range by adding an inert viscosity builder or flow control agent such as calcium carbonate or fumed silica or by combining two or more compatible polyols of differing viscosities.

The gel time or the time in which the polyol/isocyanate blend cures sufficiently to preclude further penetration should be long enough to allow the embedment compound, whose viscosity has been controlled through the use of a prepolymer or other means, to penetrate the bristles adequately, yet short enough to make rapid production and quality control possible. The gel time is normally controlled by adjustment of the amount of catalyst used to speed-up the NCO/OH reaction. Tin-containing organic esters such as dibutyltin dilaurate are widely used as urethane reaction catalysts for this purpose. Sometimes these are fortified or replaced by amine type catalysts or catalysts having another metal such as mercury. It is also possible to use delayed action catalysts which allow the polyol and isocyanate blend to remain relatively low in viscosity until shortly before gelation. It has also been found that the use of tri- or tetrafunctional polyols containing as part of their chemical structure a tertiary amine has been helpful in adjusting the urethane reaction rate. An example of such a polyol is Quadrol, a tetrafunctional amino polyol supplied by BASF Wyandotte.

A further desired characteristic of the embedment compound of the present invention is that it be resistant to the various solvents with which the paintbrush is intended to be used. Most polyurethane compounds which are hard enough and structurally rigid enough to function as a bristle embedment compound exhibited acceptable resistant to most weaker paint solvents such as water, turpentine, mineral spirits and the like. Thus, if the paintbrush is intended to be used only with solvents of this type, there are a relatively large number of polyurethane compounds that would work, providing they have the necessary degree of hardness and structural rigidity to function as a bristle embedment compound. If the paintbrush is intended to be used with a relatively strong paint solvent such as lacquer thinner or the like, or if one does not know with what solvents the paintbrush will be used or cleaned and thus wishes to make it sufficiently resistant to all paint solvents, the urethane embedment compound must have a relatively high degree of crosslinking. A correlation has been found between the degree of crosslinking in a polyurethane compound and the resistance to strong paint solvents such as lacquer thinner.

One way of determining whether an embedment compound is resistant to a particular solvent to an acceptable degree is to follow ASTM D 471 procedure by immersing a sample of the compound in the solvent for a period of 22 hours at 23° C. and then measuring the percentage of weight gain of the sample. Although what is acceptable solvent resistancy will vary with the application for which the brush is intended, etc., a sample which gains about 6% or less by weight of the solvent during a 22 hour immersion period is generally considered to exhibit sufficient resistance to such solvent. To exhibit sufficient resistance to strong paint solvents such as lacquer thinner, the polyurethane embedment compound should have a calculated crosslink density greater than about 15 crosslinks per 10,000 cubic centimeters (cc) of cured urethane and preferably a calculated crosslink density greater than about 25 crosslinks per 10,000 cc of cured urethane. For purposes of the present specification, the calculated crosslink density of an embedment compound is defined as the number of calculated crosslinks in 10,000 cubic centimeters (cc) of cured polyurethane composition. For purposes of defining the limits with respect to the preferred embedment compound of the present invention, the calculated crosslink density of the particular polyurethane composition is calculated from various known information about the polyol and the isocyanate components which are combined to form the polyurethane composition. Specifically, by knowing the molecular weights, the functionality and the density of the particular polyol and isocyanate components, the calculated crosslink density of the resulting polyurethane can be calculated.

To illustrate the calculation of calculated crosslink density, consider the blending of PEP-550, a tetrafunctional polyol supplied by BASF Wwandotte, with Mondur MR, an isocyanate having a functionality of 2.8 supplied by Mobay Chemical Corp. The PEP-550 has a molecular weight of 508 and a density of 1.05 grams/cc while the Mondur MR has a molecular weight of 378 and a density of 1.23 grams/cc. To produce the resulting polyurethane, 89.04 grams which equals 84.8 cc (89.04/1.05) or 0.1753 moles (89.04/508), of the PEP- 550 is blended with 100.53 grams, which equals 81.7 cc (100.53/1.23) or 0.2659 moles (100.53/378), of the Mondur MR. PEP-550 has a functionality of 4, which means it has 4 OH groups available for reaction. Since two of these groups are used in forming the linear polyurethane molecule, only two of the OH groups are available for the creation of crosslinks. Because the possible number of crosslinks per mole is two and we have used 0.1753 moles of PEP-550, there are 0.3506 (0.1753×2) possible crosslinks resulting from the PEP-550. Similarly, since the functionality of the Mondur MR is 2.8, 0.8 NCO groups are available for crosslinking. Because there are 0.2659 moles of the Mondur MR used, there are 0.2127 (0.2659×0.8) possible crosslinks resulting from the Mondur MR. By adding the crosslinks present due to the PEP-550 and the Mondur MR, we end up with 0.5633 calculated crosslinks present per 166.5 cc. When converting this to calculated crosslinks per 10,000 cc by dividing 0.5633 by 166.5 and multiplying by 10,000 a calculated crosslink density of 33.0 results. The above illustration utilizes 1.05 equivalents of Mondur MR per 1.0 equivalent of polyol.

To function adequately as an embedment compound for a paint brush, the polyurethane composition should have a certain degree of hardness and rigidity. Preferably, the cured polyurethane embedment compound should have a hardness of at least 50 on the Shore D scale.

It is contemplated that polyols and isocyanates will be suitable as reactants for the polyurethane embedment compound of the present invention if the various desired characteristics of the resulting compound such as viscosity, hardness, solvent resistance, etc. are achieved. Several polyols, however, have shown particular applicability for use in the embedment compound of the present invention. These polyols include PCP 0300, a trifunctional polycaprolactone polyol supplied by Union Carbide; TP 440, a polyether triol supplied by BASF Wyandote; Rucoflex F-2037, a polyester triol supplied by Ruco Polymer Corporation; Pluracol P-953, a sucrose initiated polyol having a functionality greater than four and supplied by BASF Wyandote; and Flexricin 17, a tetrafunctional pentaerythritol monoricinoleate polyol supplied by NL Industries. It is contemplated that a mixture of polyols could also be used as the polyol component of the polyurethane system. For example, a combination of Rucoflex F-2037 and Pluracol P-953 has been shown to be particularly applicable. In order for crosslinking to occur in the resulting embedment compound so as to result in improved solvent resistancy it is necessary for the functionality of the polyol to be greater than 2.

The isocyanate component used should also have a functionality, which when combined with the functionality of the polyol will result in a polyurethane compound having the desired crosslink density. Preferably, the isocyanate functionality should also be greater than two although isocyanates with a functionality of two may be acceptable if the functionality of the polyol is sufficient. Isocyanates such as Mondur MR, a polymeric MDI (polymethylene polypenyl isocyanate) with a functionality of 2.8, and Mondur PF, a modified MDI (Diphenylmethane diisocyanate with a functionality of two, both supplied by Mobay Chemical Corporation; Lupranate M-20 and Lupranate M-20S, both polymeric MDI's supplied by BASF Wyandotte with a functionality of about 2.7; and Mondur TD-80, a TDI (toluene diisocyanate) with a functionality of two and supplied by Mobay Chemical Corporation have been found acceptable when combined with an appropriate polyol. It is also believed that aliphatic or cycloaliphatic isocyanates will also work.

The following examples illustrate the preparation of polyurethane embedment compounds in accordance with the present invention.

EXAMPLE 1

A prepolymer was first prepared by reacting 1,032 grams (7.29 equivalent) of Pluracol TP-440, a trifunctional polyol supplied by BASF Wyandote, with 102.1 grams (0.714 equivalent) of Isonate 143L, a diisocyanate of 2.0 functionality supplied by Upjohn. These were reacted by heating the polyol to 70° C., degassing for one hour, and then adding the isocyanate dropwise over a period of one hour with stirring at 70° C. This was followed by additional heating at 70° C. for one and one half hours. The resulting prepolymer had a viscosity of 9,660 cps at 23° C. and a hydroxyl equivalent weight of 175.6. To 138.1 grams (0.8 equivalent) of this prepolymer were added 113.4 grams (0.84 equivalent) of Mondur MR, an isocyanate having a functionality of 2.8 and supplied by Mobay Chemical Corp. This blend was degassed and mixed for 5 minutes. At this point it had a viscosity of 3,740 cps. A portion of this blend was then catalyzed with 0.1 weight percent of Catalyst T-125, a tin catalyst having 16.5% tin content and being supplied by M & T Chemicals Inc. The composition was cured overnight at 100° C. and then subjected to the lacquer thinner immersion test of ASTM D 471 as previously described. The composition picked up 3.0% of its weight in solvent which is clearly within acceptable limits. The calculated crosslink density of this compound was 26.8.

EXAMPLE 2

In a further example, another portion of the blend described in Example 1 above was catalyzed with 0.08% by weight of Catalyst T-125 with the resulting composition used to embed the polyester bristles of a three inch paintbrush. The embedment was allowed to cure for four days at 23°–25° C. The bristles embedded in the ferrule were immersed in a commercial lacquer thinner for 24 hours after which they were removed and examined. The embedment was softened only slightly and the bristles, when tested either singly or in groups, were firmly embedded in the bristle cap and the bristles and the bristle cap were firmly adhered to the ferrule. They could not be dislodged by pulling strongly on the bristles and bending while holding the ferrule securely. The crosslink density of this compound as indicated above was calculated to be 26.8.

EXAMPLE 3

In another example, a prepolymer was prepared by blending 225.3 grams (1.7 equivalent) of Rucoflex F-2037, trifunctional polyol supplied by Ruco Polymer Corporation, with 12.7 grams (0.068 equivalent) of Mondur PF, an isocyanate having a functionality of 2.0 and supplied by Mobay Chemical Corp. The reactants were heated to 85° C. and stirred in a vacuum for 80 minutes during which time the temperature cooled to 73° C. This prepolymer had a viscosity of 4,560 cps at 23° C. and an hydroxyl equivalent weight of 146. To 100 grams (0.69 equivalent) of this prepolymer were added 97.2 grams (0.72 equivalent) of Mondur MR while stirring under vacuum. After 4 minutes of blending, this mixture had a viscosity of 3,700 cps at 25° C. The mixture was cured without catalyst, resulting in an embedment compound having a Shore D hardness of 75. This particular compound was in the desired viscosity range for proper control of penetration and exhibited adequate hardness for bristle embedment. It has a calculated crosslink density of 27.2.

EXAMPLE 4

In a further example, the urethane blend of Example 3 above was catalyzed with 0.1% Catalyst T-125 in two batches, one for curing at room temperature for 24 hours and the other for curing at room temperature for 13 days. At the end of these time periods, they were tested for weight gain after 24 hours immersion in lacquer thinner in accordance with the ASTM D 471 procedure. After the 24 hour cure, the compound picked up 13% by weight and after the 13 day cure, the compound picked up 4.1% by weight. Thus, increased time at room temperature clearly increased resistance to lacquer thinner. Two further batches of this same embedment compound were catalyzed with 0.1% Catalyst T-125 and cured at 100° C. for 18 hours. After six additional hours at 23° C. one batch was tested for lacquer thinner resistance and the other was allowed to age an additional 13 days before testing. The sample which was cured for 18 hours at 100° C. plus 6 hours at 23° C. picked up 0.9% by weight, whereas the sample cured for 18 hours at 100° C. plus 13 days and 6 hours at 23° C. picked up 0.3% by weight. The calculated crosslink density of this embedment compound was 27.2.

EXAMPLE 5

In another example, the urethane blend of Example 3 above was catalyzed with 0.175% Catalyst T-125 and used to embed the bristles of a three inch paintbrush with polyester bristles. The compound penetrated the packed bristles 5/32 of an inch and was allowed to age for four days before immersing in lacquer thinner for 24 hours. Upon removal, the tightness of the bristles in the embedment was judged to be excellent either when pulled singly or in groups. The bristles could not be pulled out as a unit from the ferrule either by a straight pull or by a sharp bending pull. No softening or change could be noted in the embedment compound.

EXAMPLE 6

A blend of polyols was prepared by combining 22.0 grams (0.30 equivalent) Quadrol with 124.7 grams (0.932 equivalent) of Rucoflex F-2037. This blend had a hydroxyl equivalent weight of 119 and a viscosity of 2500 cps at 23° C. 18.2 grams (0.153 equivalent) of this polyol blend was mixed with 21.7 grams (0.160 equivalent) of Mondur MR diisocyanate. After one minute of mixing, a three inch paintbrush was cast with about ten grams of this urethane composition. The gel time was about six minutes with proper penetration being exhibited.

EXAMPLE 7

In a second example using the components of Example 6, 18.2 grams (0.153 equivalent) of the polyol blend of Example 6 was mixed with 21.7 grams (0.160 equivalent) of Mondur MR diisocyanate. The mixture was poured into a mold and cured at about 65° C. for one hour. This composition picked up 2.1% of its weight in lacquer thinner solvent when evaluated with the ASTM D 471 procedure. Hardness of this composition was about Shore D 80. Calculated crosslink density was 31.7

EXAMPLE 8

A blended polyol was prepared by combining 240.0 grams (2.160 equivalent) of Pluracol P-953 with 360.0 grams (2.690 equivalent) of Rucoflex F-2037. This combination was mixed well at a slightly elevated temperature under reduced pressure to degas. The blend had a hydroxyl equivalent weight of 123.7, a viscosity of 4500 cps at 23° C. and a specific gravity of 1.184. 200.0 grams of this blend was catalyzed with 0.100 grams of Catalyst T-5 supplied by M & T Chemicals, Inc. and mixed well. 14.0 grams (0.113 equivalent) of this catalyzed blend was combined with 16.0 grams (0.118 equivalent) of Mondur MR and mixed for one minute. Ten grams of the mixture was introduced into the potted bristles of a three inch paintbrush. This embedment compound penetrated to a proper amount and gelled in about seven minutes.

EXAMPLE 9

70.0 grams (0.566 equivalent) of the catalyzed polyol blend referred to in Example 8 above was combined with 80.0 grams (0.590 equivalent) of Mondur MR. This blend was mixed for one minute under reduced pressure, then poured into a mold and cured at 60° C. for one hour. When exposed to the solvent resistency test in accordance with ASTM D 471, this composition picked up 1.5% of its weight in lacquer thinner. This composition had a hardness of Shore D 80 and a calculated crosslink density of 92.2.

In addition to the above examples, testing was done with respect to several additional urethane blends. These included combining a number of different polyols and polyol blends with Mondur MR isocyanate. After mixing the two components with a 5% excess of isocyanate, the composition was cured overnight at 110° C. The samples were then immersed for 22 hours in lacquer thinner and measurements were taken to observe changes in weight, hardness and volume. Based upon these tests, the following polyols and polyol blends showed acceptable solvent resistance:

a. A polyol blend of hydroxymethyl octadecanol and bis(hydroxylmethyl)octadecanol in a 3:1 ratio.
b. A polyol blend of PCP 0300 (a triol) and PCP 0200 (a diol), both supplied by Union Carbide, in a 3:1 ratio.
c. PCP 0300, a triol supplied by Union Carbide.
d. PEP 650, a pentaerythritol initiated polyol supplied by BASF Wyandotte.
e. PEP 550, a pentaerythritol initiated polyol supplied by BASF Wyandotte.
f. Flexricin 17, a pentaerythritol monoricinoleate supplied by NL Industries.
g. Pluracol TP-440, a polyether triol supplied by BASF Wyandotte.
h. A polyol blend of Quadrol, a tetrafunctional amino polyol supplied by BASF Wyandotte, and PCP 0300, a triol supplied by Union Carbide, in a 2:1 ratio.
i. A polyol blend of bis(hydroxyethyl)aminomethyl octadecanol and PCP 0300 in a 1:1 ratio.
j. Bis(hydroxymethyl)octadecanol.
k. A polyol blend of Pluracol 355, an aromatic amine polyol supplied by BASF Wyandotte, and PCP 0300 in a 1:2 ratio.
l. Rucoflex F-2037, a polyester triol supplied by Ruco Polymer Corporation.

m. A polyol blend of Rucoflex F-2037, a polyester triol, and Rucoflex S-1011-110, a polyester diol, supplied by Ruco Polymer Corporation in a 7:3 ratio.

n. A polyol blend of AWS-485, an aromatic amine polyol supplied by Union Carbide and PCP 0300 in a 1:2 ratio.

Based upon the above testing, it has been found that to exhibit resistance to all paint solvents, including relatively strong solvents such as lacquer thinner, a polyurethane embedment compound should have a crosslink density of at least 15, and preferably at least 25, as calculated in accordance with the method described above. To achieve this, it is necessary for either the polyol component or the isocyanate component to have a functionality greater than two. Preferably, both should have functionalities greater than two in order to improve the chances for crosslinking to occur and thus increase the crosslink density.

Although the description of the preferred embodiment and method has been quite specific, it is contemplated that various modifications could be made without deviating from the spirit of the present invention. Accordingly, it is intended that the scope of the present invention be dictated by the appended claims rather than by the description of the preferred embodiment.

We claim:

1. An embedment compound for a paintbrush or the like of the type which includes a plurality of bristles, a handle portion and an intermediate portion disposed between said bristles and said handle portion, said embedment compound functioning to bond said bristles to one another and to said intermediate portion and comprising: a highly crosslinked polyurethane composition wherein said polyurethane composition has a calculated crosslink density of at least 15 crosslinks per 10,000 cubic centimeters of cured polyurethane composition.

2. The embedment compound of claim 1 wherein said polyurethane composition has a calculated crosslink density of at least 25 crosslinks per 10,000 cubic centimeters of cured polyurethane composition.

3. The embedment compound of claim 1 wherein said polyurethane composition has an embedment viscosity of between about 2000 cps and 5000 cps.

4. The embedment compound of claim 1 wherein the cured polyurethane composition has a hardness of at least 50 on the Shore D scale.

5. The embedment compound of claim 1 wherein the polyol component of said polyurethane composition has a functionality greater than 2.

6. The embedment compound of claim 5 wherein the polyol component of said polyurethane composition is selected from one or more of the group consisting of: polycaprolactone polyols, polyether polyols, polyester polyols, sucrose initiated polyols, pentaerythritol initiated polyols, amino polyols, aromatic amine polyols and hydroxymethyl octadecanols.

7. The embedment compound of claim 5 wherein the isocyanate component of said polyurethane composition has a functionality of at least 2.

8. The embedment compound of claim 7 wherein the isocyanate component of said polyurethane is selected from one or more of the group consisting of: polymeric MDI, modified MDI and toluene diisocyanate.

9. The embedment compound of claim 1 wherein said polyurethane composition has a crosslink density sufficient to render it acceptably resistant to all paint solvents.

10. A paintbrush or the like comprising:
a generally tubular ferrule having a top end and a bottom end;
a plurality of bristles supported within said ferrule near its bottom end with a portion of said plurality of bristles extending internally within said ferrule;
a bristle embedment compound comprising a highly crosslinked polyurethane composition, wherein said polyurethane composition has a calculated crosslink density of at least 15 crosslinks per 10,000 cubic centimeter of cured polyurethane composition, disposed within said ferrule and penetrating a portion of said bristles to bond said bristles to one another and to said ferrule; and
a handle secured to and extending outwardly from the top end of said ferrule.

11. The paintbrush of claim 10 wherein said polyurethane composition has a calculated crosslink density of at least 25 crosslinks per 10,000 cubic centimeters of cured polyurethane composition.

12. The paintbrush of claim 10 wherein said polyurethane composition has a hardness of at least 50 on the Shore D scale.

13. The paintbrush of claim 10 wherein the polyol component of said polyurethane composition has a functionality greater than 2.

14. The paintbrush of claim 13 wherein the polyol component of said polyurethane composition is selected from one or more of the group consisting of: polycaprolactone polyols, polyether polyols, polyester polyols, sucrose initiated polyols, pentaerythritol initiated polyols, amino polyols, aromatic amine polyols and hydroxymethyl octadecanols.

15. The paintbrush of claim 13 wherein the isocyanate component of said polyurethane composition has a functionality of at least 2.

16. The paintbrush of claim 15 wherein the isocyanate component of said polyurethane is selected from one or more of the group consisting of: polymeric MDI, modified MDI and toluene diisocyanate.

17. The paintbrush of claim 10 wherein said polyurethane composition has a crosslink density sufficient to render it acceptably resistant to all paint solvents.

18. A method of manufacturing a paintbrush or the like of the type having a plurality of bristles, a handle and an intermediate portion disposed between said handle and bristles comprising the steps of:
supporting a plurality of bristles with respect to said intermediate portion;
bonding said plurality of bristles to one another and to said intermeditae portion with an effective quantity of an embedment compound comprising a highly crosslinked polyurethane adhesive, wherein said polyurethane composition has a calculated crosslink density of at least 15 crosslinks per 10,000 cubic centimeters of cured polyurethane composition.

19. The method of claim 18 wherein said intermediate portion includes a generally tubular ferrule and said method includes supporting said bristles within one end of said ferrule and injecting an effective quantity of said embedment compound into the other end of said ferrule and allowing the same to penetrate a desired distance during curing.

20. The method of claim 19 wherein said polyurethane composition has a calculated crosslink density of at least 25 crosslinks per 10,000 cubic centimeters of cured polyurethane composition.

21. The method of claim 19 including preparing a prepolymer of said embedment compound having a viscosity between about 2500 cps and 10,000 cps.

22. The method of claim 19 including preparing a blend of two or more polyols having a blended viscosity of between about 2500 cps and 10,000 cps to form the polyol component of said polyurethane composition.

* * * * *